US012151756B2

(12) United States Patent
Cooney (10) Patent No.: US 12,151,756 B2
(45) Date of Patent: Nov. 26, 2024

(54) BICYCLE HANGER

(71) Applicant: Mark Cooney, Batavia, IL (US)

(72) Inventor: Mark Cooney, Batavia, IL (US)

( * ) Notice: Subject to any disclaimer, the term of this patent is extended or adjusted under 35 U.S.C. 154(b) by 0 days.

(21) Appl. No.: 18/205,529

(22) Filed: Jun. 3, 2023

(65) Prior Publication Data
US 2023/0415836 A1 Dec. 28, 2023

Related U.S. Application Data

(60) Provisional application No. 63/355,393, filed on Jun. 24, 2022.

(51) Int. Cl.
*B62H 3/12* (2006.01)
*B62H 3/02* (2006.01)

(52) U.S. Cl.
CPC ............ *B62H 3/12* (2013.01); *B62H 3/02* (2013.01)

(58) Field of Classification Search
CPC .... B62H 3/12; B62H 3/02; B62H 3/10; B60R 9/06; B60R 9/10; Y10S 224/924
See application file for complete search history.

(56) References Cited

U.S. PATENT DOCUMENTS

| | | | | |
|---|---|---|---|---|
| 607,545 A * | 7/1898 | Martin | ............ | B62H 3/00 24/457 |
| 4,687,167 A * | 8/1987 | Skalka | ............ | A47B 21/0314 108/103 |
| 5,664,717 A * | 9/1997 | Joder | ............ | B60R 9/06 224/532 |
| 5,845,832 A * | 12/1998 | Eichmann | ............ | B60R 9/06 224/495 |
| 5,887,461 A * | 3/1999 | Heffley | ............ | E05B 71/00 211/8 |
| 6,123,498 A * | 9/2000 | Surkin | ............ | B60R 9/06 224/924 |
| 6,234,372 B1 * | 5/2001 | Rivera | ............ | B60R 9/10 224/535 |
| 6,435,523 B1 * | 8/2002 | Hilk | ............ | B62K 13/08 280/7.11 |
| 6,547,116 B2 * | 4/2003 | Anderson | ............ | B60R 9/10 224/536 |
| 6,751,992 B1 * | 6/2004 | Esquilin | ............ | B62H 3/02 70/227 |
| 7,261,229 B1 * | 8/2007 | Allen | ............ | B60R 9/10 224/495 |
| 7,469,806 B2 * | 12/2008 | Garoffolo | ............ | B60R 9/10 224/310 |
| 7,712,614 B2 * | 5/2010 | Carlson | ............ | F16M 11/242 248/176.1 |
| 8,286,843 B2 * | 10/2012 | Bogoslofski | ............ | B60R 9/10 224/532 |
| 9,381,868 B2 * | 7/2016 | Anyan | ............ | B60R 9/10 |
| 10,870,397 B2 * | 12/2020 | Pokriefka | ............ | B60R 11/02 |

(Continued)

*Primary Examiner* — Ko H Chan
(74) *Attorney, Agent, or Firm* — Law Offices of Konrad Sherinian, LLC; Jeffrey S. Dixon (57) ABSTRACT

A space-efficient wall mounted bicycle hanger. The hanger comprises a linkage that includes a wall mount, a folding extension arm that is foldable in a horizontal folding plane, and a bicycle support pivotally connected to a distal end of the foldable extension arm. The support is rotatable in the horizontal folding plane for yaw angle adjustment of a supported bicycle and can also be rotatable in a vertical tilting plane for pitch angle adjustment.

5 Claims, 7 Drawing Sheets

(56) References Cited

U.S. PATENT DOCUMENTS

| | | | |
|---|---|---|---|
| 2005/0056740 A1* | 3/2005 | Chuang | B62H 3/12 |
| | | | 248/176.1 |
| 2007/0221794 A1* | 9/2007 | Li | F16M 13/02 |
| | | | 248/124.1 |
| 2009/0057522 A1* | 3/2009 | Bedell/Fiore | B62H 3/12 |
| | | | 29/525.11 |
| 2011/0233351 A1* | 9/2011 | Foster | F16M 13/00 |
| | | | 248/125.7 |
| 2016/0361960 A1* | 12/2016 | Wright | B62H 3/12 |
| 2024/0025503 A1* | 1/2024 | Chuang | B25H 1/0042 |

* cited by examiner

BICYCLE HANGER

CROSS REFERENCE

This application claims the priority benefit of U.S. Provisional Application No. 63/355,393, filed on Jun. 24, 2022, entitled "BICYCLE HANGER," which is hereby incorporated by reference herein in its entirety.

FIELD OF THE DISCLOSURE

The present disclosure relates to articulating wall-mounted bicycle hangers.

SUMMARY

According to an aspect of the disclosure, a bicycle hanger comprises a wall mount, a folding extension arm connected to the wall mount, and a bicycle support connected to the folding extension arm. The wall mount has a rear side, a front side, a top side, and a bottom side, the wall mount being adapted to be fixedly mounted to a vertical wall with the wall mount rear side facing the vertical wall. The folding extension arm comprises a first arm segment and a second arm segment, the first arm segment having a first arm segment proximal end and a first arm segment distal end, the second arm segment having a second arm segment proximal end and a second arm segment distal end, the folding extension arm having a proximal end at the first arm segment proximal end and a distal end at the second arm segment distal end. The first arm segment proximal end is pivotally connected to the wall mount, and the second arm segment proximal end is pivotally connected to the first arm segment distal end, so that the folding extension arm is articulable in a horizontal folding plane when the wall mount is mounted in an upright orientation to the vertical wall with the wall mount top side positioned vertically above the wall mount bottom side. The bicycle support is connected to the distal end of the folding extension arm, the bicycle support being adapted to support a bicycle by hanging the bicycle on the bicycle support.

BRIEF DESCRIPTION OF THE DRAWINGS

Although the characteristic features of this disclosure will be particularly pointed out in the claims, the subject matter of the claims, and the manner in which it may be made and used, may be better understood by referring to the following description taken in connection with the accompanying drawings forming a part hereof, wherein like reference numerals refer to like parts throughout the several views and in which:

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, unless otherwise clearly stated, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1:
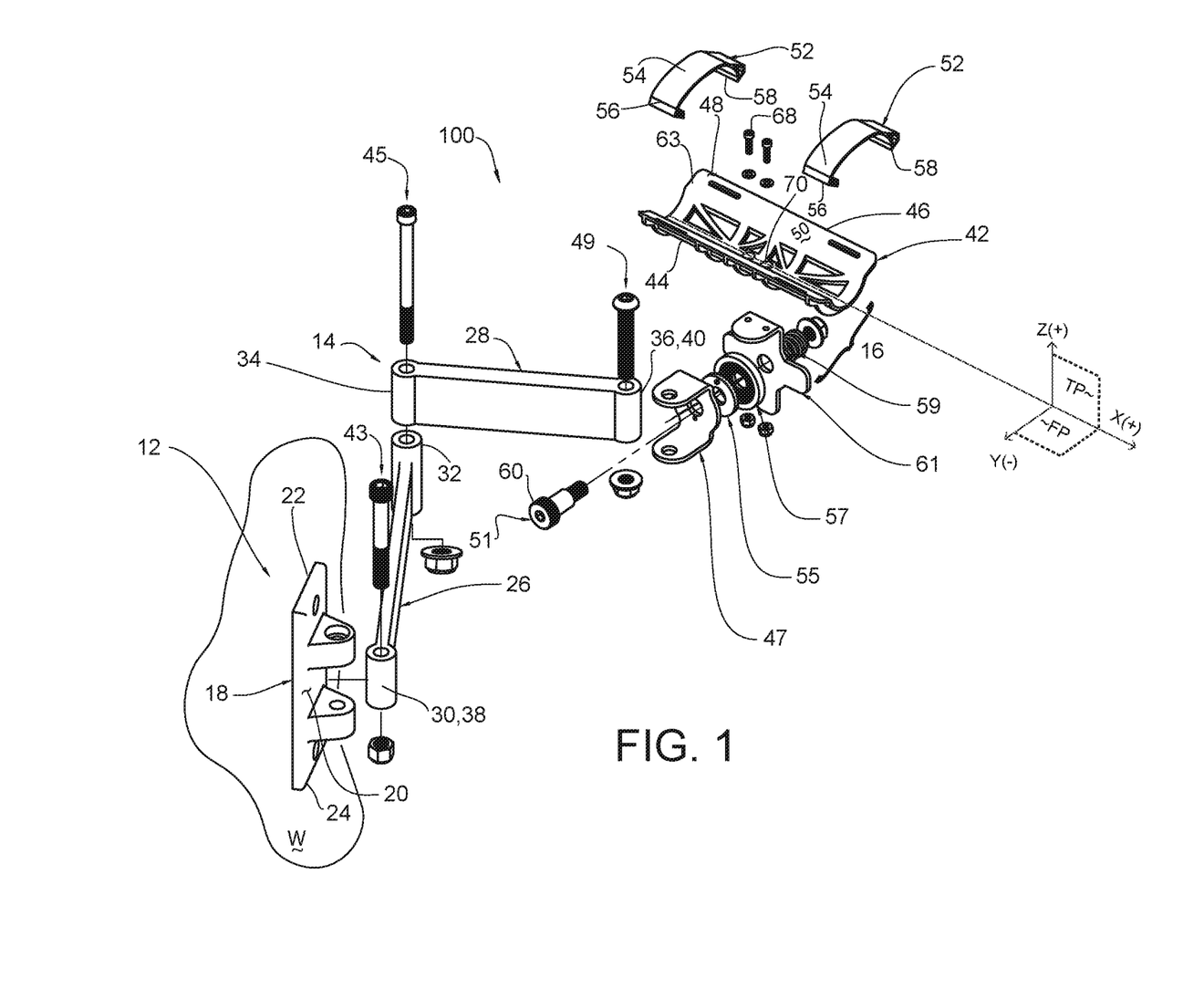
FIG. 1 is an exploded perspective view of a top tube mount bicycle hanger according to an embodiment.
Figure 2:
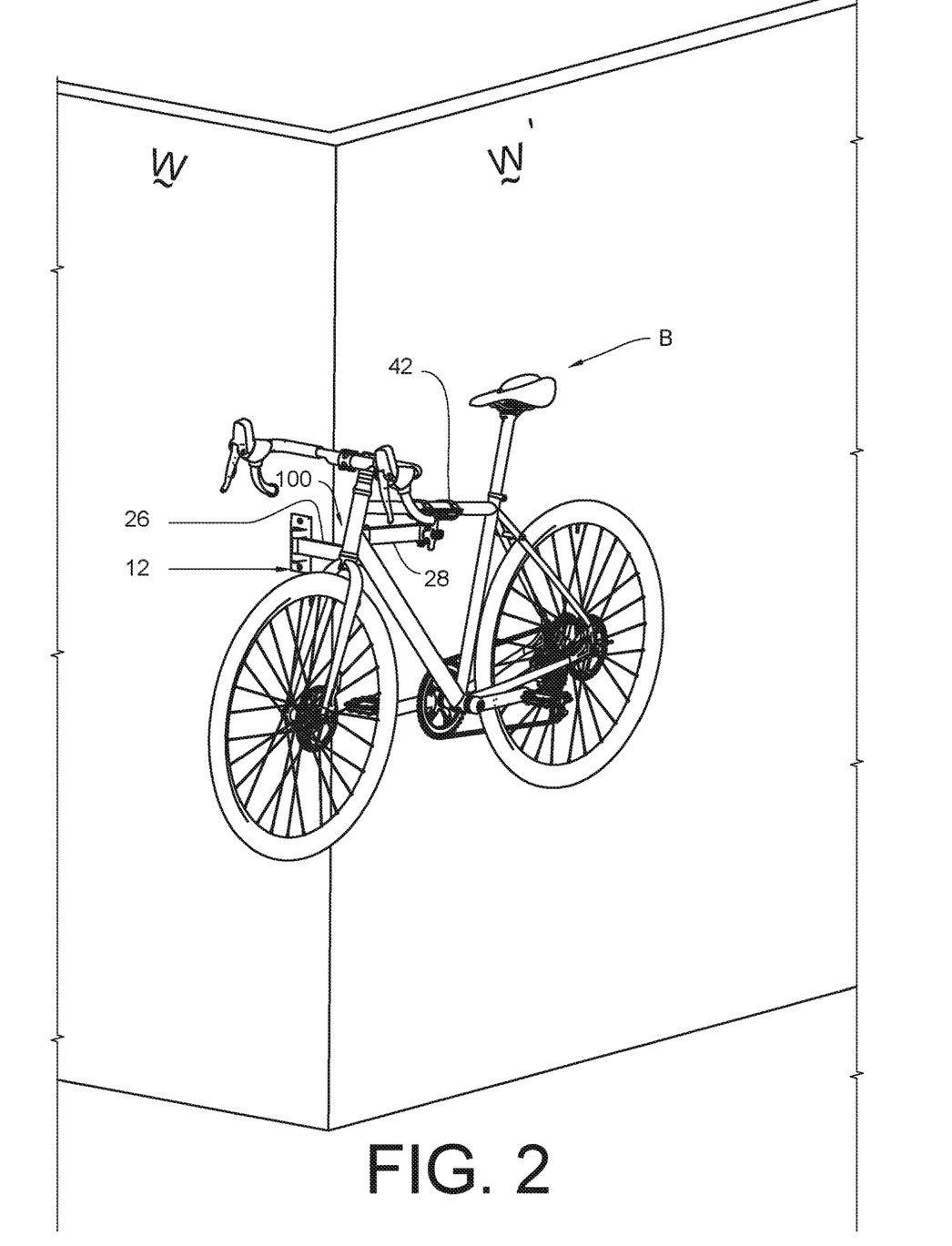
FIG. 2 is an illustration of a use of the top tube mount bicycle hanger of FIG. 1 to hang a bicycle on a wall.
Figure 3:
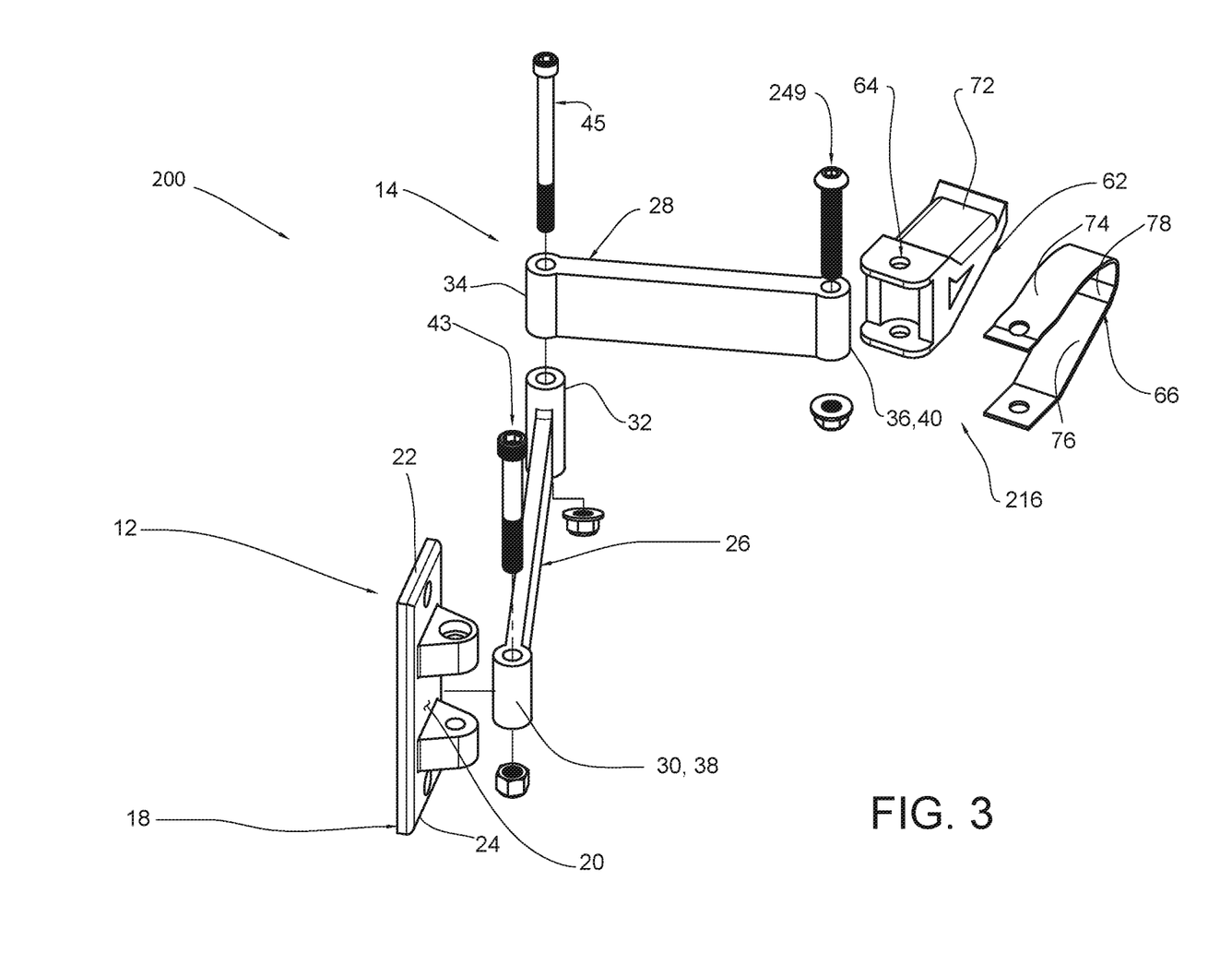
FIG. 3 is an exploded perspective view of a seat mount bicycle hanger according to another embodiment.
Figure 4:
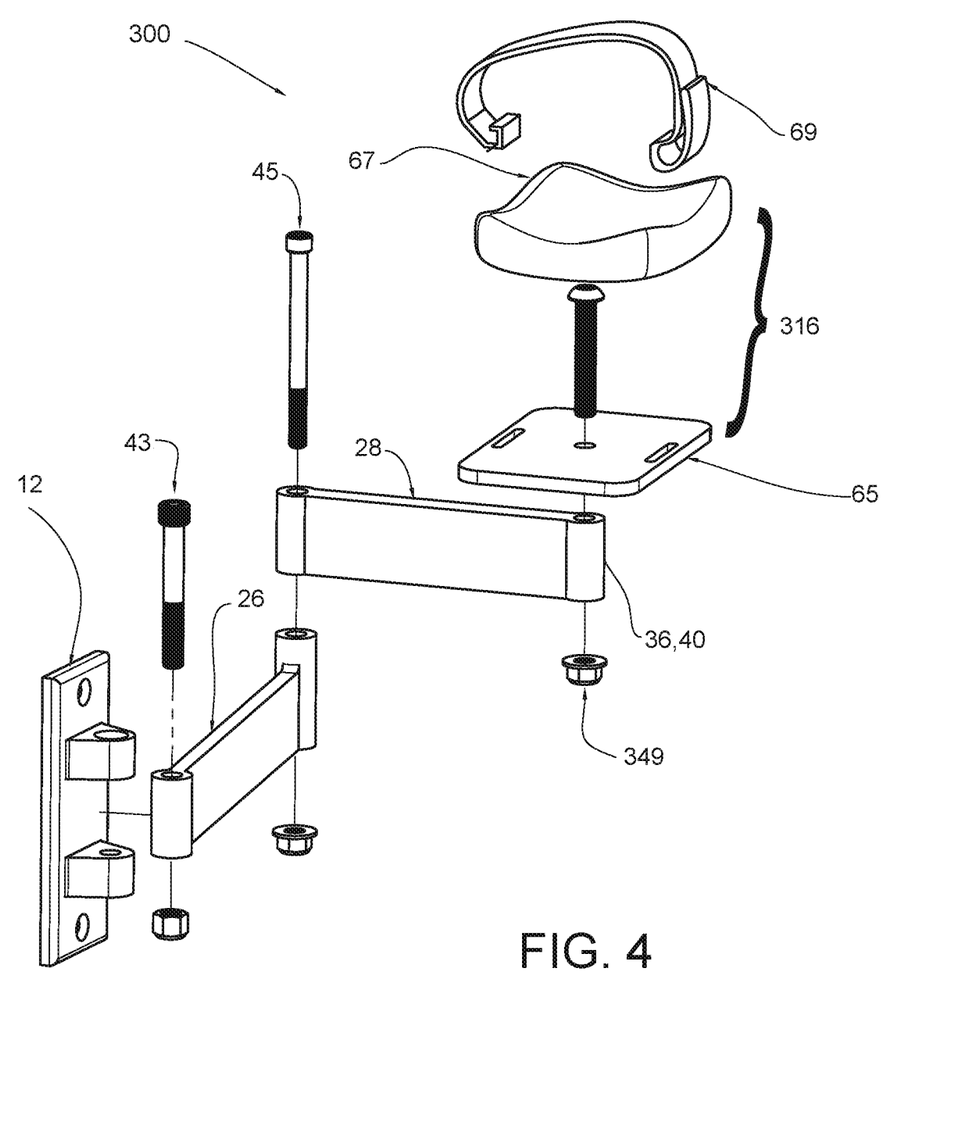
FIG. 4 is an exploded perspective view of another seat mount bicycle hanger according to another embodiment.

Embodiments of wall-mounted bicycle hangers are described in this section, with reference to the accompanying drawings, FIGS. 1-4. More particularly, a first embodiment of a wall-mounted bicycle hanger 100, for use in hanging a bicycle by its top tube and hence also referred to herein as a top tube mount hanger 100, is shown in FIGS. 1-2. A second embodiment of a wall-mounted bicycle hanger 200, for use in hanging a bicycle by its seat and hence also referred to herein as a bicycle seat mount hanger 200, is shown in FIGS. 3-4.

An embodiment of a bicycle hanger is illustrated in FIGS. 1-2, as a top tube mount hanger 100. The top tube mount hanger 100 includes a wall mount 12, a folding extension arm 14 connected to the wall mount 12; and a bicycle support, which is specifically a top tube mount 16, connected to the folding extension arm 14. The top tube mount 16 is adapted to support a bicycle by hanging the bicycle on the top tube mount 16. More particularly, the top tube mount 16 includes a top tube cradle 42, for receiving and underside of a bicycle top tube placed on the top tube cradle 42 so as to support the bicycle thereon. The wall mount 12 has a rear side 18, a front side 20, a top side 22, and a bottom side 24. As seen in FIG. 1, the wall mount 12 is adapted to be fixedly mounted to a vertical wall W with the wall mount rear side 18 (hidden in this view) facing the vertical wall W, and the wall mount front side 20 facing outwardly, away from the vertical wall W.

The folding extension arm 14 comprises a first arm segment 26 and a second arm segment 28. The first arm segment 26 has a first arm segment proximal end 30 and a first arm segment distal end 32, and the second arm segment 28 has a second arm segment proximal end 34 and a second arm segment distal end 36. The first arm segment proximal end 30 is pivotally connected to the wall mount 12 by a first vertical bolt joint 43, and the second arm segment proximal end 34 is pivotally connected to the first arm segment distal end 32 by a second vertical bolt joint 45, so that the folding extension arm 14 is articulable in a folding plane FP. With respect to the x-y-z coordinate reference frame shown in FIG. 1, the folding plane FP is an x-y plane, which is horizontal when the wall mount 12 is mounted in an upright orientation to the vertical wall W, with the wall mount top side 22 positioned vertically above the wall mount bottom side 24.

The folding extension arm 14 has an extension arm proximal end 38 at the first arm segment proximal end 30 and an extension arm distal end 40 at the second arm segment distal end 36. Accordingly, "extension arm proximal end 38" and "first arm segment proximal end 30" may refer interchangeably to the same structure of the illustrated embodiment, as may "extension arm distal end 40" and "second arm segment distal end 36." It should be noted, however, that in embodiments of a bicycle hanger according to this disclosure, including embodiments not shown in the drawings, a folding extension arm includes more than two arm segments or other links, and/or additional links other than those of the folding extension arm are connected between a wall mount and a bicycle support, whether in series or in parallel with the folding extension arm, such as to provide additional degrees of freedom of movement of the bicycle support relative to the wall mount. In addition, the use of consecutive ordinals such as "first" and "second" is not meant to require an order in which the links are connected in series. For example, in other embodiments not shown, a "third arm segment" can be an intermediate arm segment connected between a first arm segment that is connected directly to the wall mount and a second arm segment that is connected to the bicycle support.

Advantageously, the articulation of the folding extension arm 14 permits a user to extend and retract the top tube mount 16 away from and toward the vertical wall W, as well as varying its lateral position along the wall by as much as about twice the length of the extension arm, by swiveling the fully extended arm by about one-hundred eighty degrees in the folding plane FP. This can be beneficial not only for positioning a supported bicycle as desired for storage, but also for repositioning a supported bicycle to enable access to obstructed space. For example, a user may swivel the supported bicycle to one side on the extension arm 14 to move the bicycle out of the way of a circuit breaker panel or the like, followed by returning the bicycle to its previous storage position, without having to lift the bicycle down from the hanger 100. Alternatively, a user may swivel the bicycle indefinitely to a new lateral position to enable reordering other stored items along the wall.

Thus, the top tube mount 16 is said to be connected to the folding extension arm 14 at the extension arm distal end 40, which in the illustrated embodiment is also the distal end 36 of the second arm segment 28. The top tube mount 16 is rotatably connected to the folding extension arm 14 so to permit relative rotation in the folding plane FP. Advantageously, this freedom of rotation of the top tube mount 16 allows a user to adjust the "yaw" angle of a supported bicycle B relative to the vertical wall W, for example, so as to remain parallel to the vertical wall W to minimize a depth of a space occupied by the supported bicycle B. In other situations, a user may adjust the yaw angle so as to be oblique to the wall W, for example, when storage depth from the wall is not so constrained but storage width along the wall W is more limited. In addition, in combination with the freedom of articulation of the folding extension arm 14, the freedom of rotation of the top tube mount 16 can further permit a bicycle B to be supported in surprising orientations relative to a wall W to which the wall mount 12 is mounted. For example, as shown in FIG. 2, the wall mount 12 is mounted to a wall W near an outside corner, where the wall W meets an adjoining wall W'. This allows the first arm segment 26 to be pivoted so to extend through the plane of the adjoining wall W', and the second arm segment 28 to be pivoted approximately parallel to the adjoining wall W', while the top tube mount 16 can be rotated to extend approximately perpendicularly from the second arm segment 28, for supporting the bicycle B approximately parallel to the adjoining wall W'.

The top tube mount 16 is rotatably connected to the distal end 40 of the folding extension arm 14 so as to permit relative rotation of the top tube mount 16 in a tilting plane TP. With respect to the reference frame shown in FIG. 1, the tilting plane TP is an x-z plane, which is vertical when the wall mount 12 is mounted in its upright orientation. More particularly, the tilting plane TP generally bisects the top tube cradle 42, so that the top tube cradle 42 can be adjusted to be oriented horizontally or inclined downwardly or upwardly along its longitudinal cradle axis (depicted as the x-axis of the reference frame shown in FIG. 1), while a pair of opposed longitudinally extending edges 44, 46 of the cradle 42 remain spaced apart horizontally. This allows for the adjustment of the pitch angle of a bicycle supported on the top tube mount 16. Pitch angle adjustment is particularly beneficial in a bicycle support which, like the top tube mount 16, is a top tube mount 16, adapted for hanging a bicycle by its top tube. Many common bicycle frames have a horizontal top tube, while others have a top tube that is inclined or curved downwardly from the head tube to the seat tube. A bicycle with such an inclined or curved top tube mounted on the top tube mount 16, with the cradle 42 oriented horizontally, would be pitched downwardly from rear to front, thus occupying more vertical storage space, as well as potentially being more unstable, than in a level riding orientation. Thus, it may be desired to adjust the angle of the cradle 42 in the tilting plane TP to match that of the top tube of a supported bicycle. In addition, it may in some situations be desired to pitch a supported bicycle at a downward angle, such as when additional vertical storage clearance is available, and it is desired to reduced the width along the wall W of space occupied by the supported bicycle when pitched forward, compared to that which it occupies when level.

To permit a top tube mount freedom of rotation in the folding plane FP and in the tilting plane TP, the top tube mount may be connected to an extension arm by a joint that provides both such degrees of freedom, such as a friction-locking ball joint, or, more typically, the top tube mount can be connected to the extension arm by one or more connecting links, as is the case in the illustrated embodiment of the bicycle top tube mount hanger 100. In particular, the hanger 100 further includes a connecting link 47 connected between the second arm segment 28 and the top tube mount 16, the connecting link 47 being connected to the second arm segment 28 by a first connecting link pivotal joint 49 (which is also a third vertical bolt joint 49) and to the bicycle support by a second connecting link pivotal joint 51. The first connecting link pivotal joint 49 permits the connecting link 47 to rotate in the folding plane FP relative to the second arm segment 28 and the second connecting link pivotal joint 51 permits the top tube mount 16 to rotate in the tilting plane TP relative to the connecting link 47. More particularly, the second connecting link pivotal joint 51 comprises a locking mechanism that is engageable to hold a bicycle on the top tube mount 16 at a selected pitch angle in the tilting plane TP and disengageable to permit adjustment of the pitch angle of the supported bicycle. In the main illustrated embodiment, the second connecting link pivotal joint 51 comprises a first locking ring 55 and a second locking ring 57. The first locking ring 55 is affixed or locked to the connecting link 47, and the second locking ring 57 is affixed or locked to the top tube mount 16, with respect to rotation about the joint 51. The locking rings 55, 57 are in axially aligned opposition and include locking features to lock rotation of the joint 51 when pressed axially together. An axial biasing element, illustrated as the compression spring 59, provides an axial biasing force tending to bias the second locking ring 57 axially against the first locking ring 55, and a manual adjuster, illustrated as an adjustment screw is operative to increase and decrease the axial biasing force to lock and unlock rotation of the joint 51. In an alternative embodiment not shown, the second connecting link pivotal joint may simply comprise a bolted connection with a bolt that can be tightened to frictionally lock a pitch angle and loosened to permit pitch angle adjustment.

As best seen in FIG. 1, the top tube cradle 42 comprises the previously mentioned pair of longitudinally extending, opposed cradle edges 44, 46, as well as a cradle opening 48 between the cradle edges 44, 46. The cradle edges 44, 46 are adapted to straddle a bicycle frame top tube underside, when the top tube underside is received in the cradle opening 48, so as to dip down between the cradle edges 44, 46. More particularly, the top tube cradle 42 further comprises a channel support surface 50 disposed below the cradle opening 48, the channel support surface 50 extending continuously across the cradle opening 48 and being adapted and configured to contact a top tube underside when the top tube underside is received in the cradle opening 48. More particularly, the channel support surface 50 is generally semi-cylindrical to conform to a typical top tube shape.

In another embodiment (not shown), a top tube cradle includes cradle edges analogous to the edges 44, 46, in the form of a pair of opposed parallel longitudinal support rods, but omits a channel support surface spanning a transverse gap between the rods, the rods thus supporting a top tube at opposite sides of its lowest point, but without contacting a lowermost arc of a profile of the top tube that extends between the rods.

The bicycle top tube mount 16 further includes a flexible top tube strap 52. The top tube strap 52 is adapted and configured to permit at least a wrapped segment 54 of the top tube strap 52 to be tightly wrapped over a top side of a top tube when the underside of the top tube is placed on the top tube cradle 42, and to be secured to the top tube mount 16 at opposite ends 56, 58 of the wrapped segment 54. In this manner, the wrapped segment 54 can apply a holding force to the top side of the top tube, tending to hold the top tube underside against the top tube cradle 42. In embodiments, the holding force may be nominal or zero when the supported bicycle is balanced over the top tube cradle 42; that is, when a portion of the top tube received in the top tube cradle 42 overlaps a center of mass of the bicycle, while the strap 52 can provide a larger holding force when the bicycle is shifted forward or backward so as to become unstable and/or when the bicycle is acted on by a steady outside force tending to urge the top tube out of its seated position in the top tube cradle 42. In other embodiments, the top tube strap 52 is an elastic member with a relaxed length shorter than that of the wrapped segment 54, so that the top tube strap 52 is always stretched so as to provide a substantial holding force whenever connected. In other embodiments, the top tube strap 52 can be tightened when secured to the top tube cradle 42, such as by pulling one or more slack ends to shorten the length of a wrapped segment that extends between two fixed connection points (not shown) on the top tube mount 16.

The top tube mount 16 further comprises a top tube mount base 61 formed of a first material, at least a contact portion 63 of the top tube cradle 42 being formed of a second material, the second material being softer than the first material. The top tube cradle 42 is disposed over the top tube mount base 61 so that when a bicycle frame top tube underside is placed on the top tube cradle 42, the top tube underside contacts the contact portion 63 of the top tube cradle 42 and does not contact the top tube mount base 61. In addition, the top tube cradle 42 is attached to the top tube mount base 61 so as to avoid contact between a supported top tube and a fastener. More particularly, the top tube cradle 42 is attached by screws 68 that extend through countersunk holes 70 formed at the bottom of the channel support surface 50, so that the heads of screws 68 are recessed below the channel support surface 50 when assembled. The first material can be a metallic material, and the second material can be a plastic material. In the illustrated embodiment, the top tube cradle 42 is a one-piece member formed of one material, such as a molded plastic member, so that the contact portion 63 is composed of the same material as the rest of the cradle 42. In other embodiments not shown, a top tube cradle can comprise a relatively hard and stiff cradle frame and a relatively soft and flexible cradle padding member that includes a contact portion of the cradle. The cradle padding member may be made of a foam or rubber material, placed over the cradle frame, the cradle padding member comprising a contact portion of the cradle.

Other embodiments of bicycle hangers are illustrated in FIGS. 3-4 as the bicycle seat mount hangers 200, 300. The bicycle seat mount hanger 200 includes the same wall mount 12 and extension arm 14 as in the bicycle top tube mount hanger 100, and essentially differs in that it includes a bicycle support comprising a seat mount 216 for hanging a bicycle by its seat instead of by its top tube. Being that a bicycle seat is generally oriented horizontally regardless of frame style, a bicycle seat mount hanger according to this disclosure is less likely than a bicycle top tube mount hanger to need or benefit from permitting adjustment of a pitch angle of a supported bicycle. Accordingly, the bicycle seat mount hanger 200 is illustrated with a bicycle seat mount 216 that is rotatably connected directly to the second arm segment 28 by a third vertical bolt joint 249 so as to permit relative rotation only in the horizontal folding plane of the extension arm 14. In addition, the bicycle seat mount 216 is especially adapted and configured for supporting a bicycle seat. More particularly, as seen in FIG. 3, the illustrated seat mount 216 comprises a wedge-shaped seat cradle 62 including a connecting portion 64 for connecting to the second arm segment 28 by a simple bolted joint and a formed support portion 72 adapted to receive the underside of a typical narrow front section of a standard bicycle saddle placed thereon.

The seat mount 216 further includes a flexible seat strap 66. The seat strap 66 is analogous to the top tube strap 52 of the previous embodiment, being adapted and configured to permit at least a segment of the seat strap 66 to be tightly wrapped around part of a bicycle seat when an underside of the seat is placed on the seat cradle 62, and to be secured to the seat mount 216 at opposite ends of the wrapped segment, so as to apply a holding force to the wrapped part of the seat, tending to hold the seat underside against the seat mount. For example, when the aforementioned narrow front section of a standard bicycle saddle is placed on the seat cradle 62, the seat strap 66 can be wrapped over the entire seat itself, or it can wrapped over at least one of the saddle rails located on the underside of a standard saddle. The seat strap 66 includes an upper segment 74 and a lower segment 76, each segment 74, 76 having a hole at its respective proximal end for integral retention of the respective segment by a bolt of the vertical bolt joint 249. The segments 74, 76 are detachably connected by a suitable connector 78, which may, for example, comprise a tension adjustment buckle, such as a ladder-lock slider (not shown) analogous to that commonly used for backpack strap adjustment, preferably in combination with a suitable quick release clip to permit detaching the segments without undoing the tension adjustment. Alternatively, the connector 78 may comprise a complementary pair of hook-and-loop fastener patches (such as those associated with the trademark Velcro®) affixed to the respective segments 74, 76.

In yet another embodiment, shown in FIG. 4 as another seat mount bicycle hanger 300, a bicycle support comprises a seat mount 316. The seat mount 316 includes a support member 65, illustrated as a simple flat ledge, covered by a padding member 67 for placing an underside of a bicycle seat member thereon, as well as a seat strap 69 for wrapping over and securing a supported bicycle seat member to the seat mount 316. The support member 65 is connected to the second arm segment 28 by a third vertical bolt joint 349 so that the support member 65 is rotatable about its own center with respect to the second arm segment 28. The padding member 67 has concave contours on its top side to help position and align a supported seat underside. The padding member 67 is compressible so as to allow the seat underside to nest in a deformed recess in the padding member 67 while surrounding undeformed material of the padding member 67 resists lateral shifting of the supported seat from its nested position. The padding member 67 should have a broad enough area on its top side to accommodate most common bicycle seat member shapes and sizes, but its shape can be dissimilar to those of common seat members. For example, the top side of the padding member can be rectangular, with a length dimension (perpendicular to the seat strap 69 as shown) from about 4.0 inch to about 6.0 inch, or more particularly about 5.0 inch, and a width dimension (parallel to the seat strap 69) from about 3.0 inch to about 4.0 inch, or more particularly about 3.5 inch. The support member 65 is formed of a first material, such as a metallic material, and the padding member 67 is formed of a second material, the first material being stronger than the second material, and the second material being softer than the first material. The seat mount 316 is adapted and configured to support a bicycle hung on the seat mount 316 by placing the underside of a seat member of the bicycle on the padding member 67, without any part of the bicycle contacting the support member 65.

Figures 5, 7:
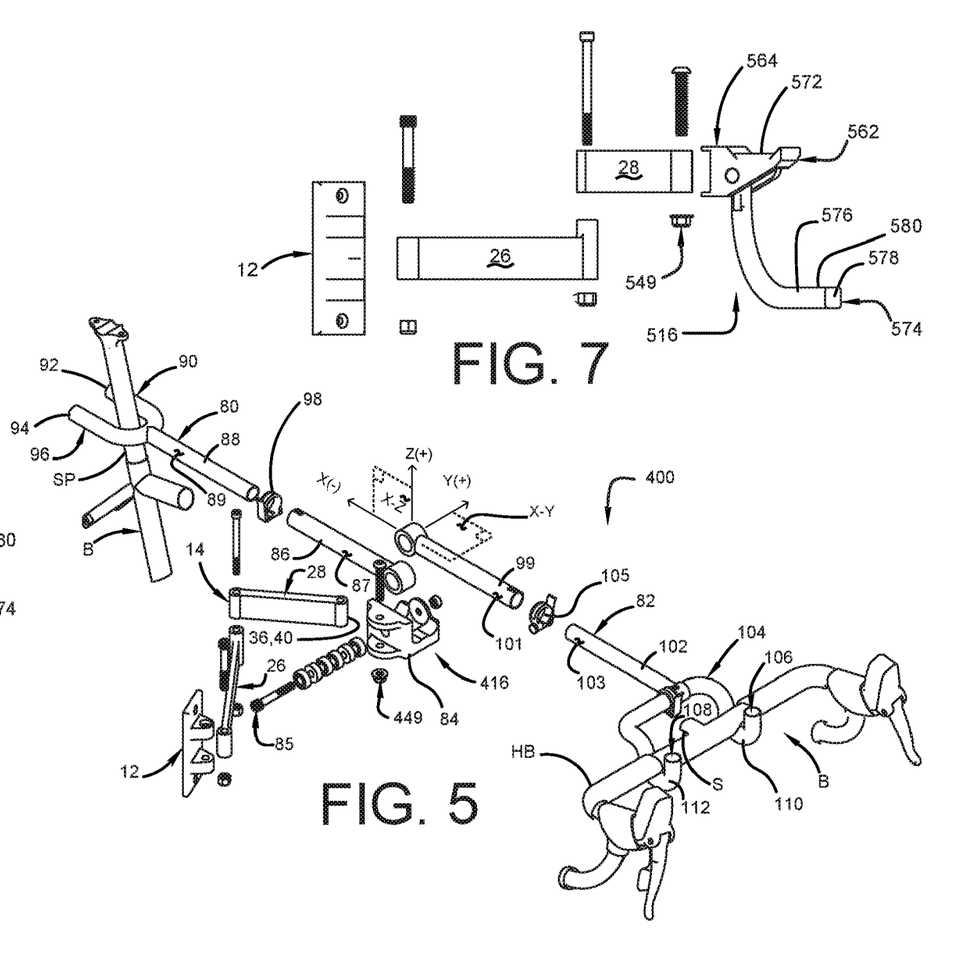
FIG. 5 is an exploded perspective view of a seat and handlebar mount bicycle hanger according to another embodiment.
FIG. 7 is an exploded elevation view of the seat mount bicycle hanger of FIG. 6.

Yet another embodiment of a bicycle hanger including the folding extension arm 14 is shown in FIG. 5 as a seat and handlebar (or "butterfly") mount bicycle hanger 400. A bicycle support of the butterfly mount bicycle hanger 400 comprises a seat and handlebar (or "butterfly") mount 416. The butterfly mount 416 includes a pair of extendable arms, namely, an extendable seat arm 80 and an extendable handlebar arm 82. With respect to the x-y-z coordinate reference frame shown in FIG. 5, proximal ends of the seat and handlebar arms 80, 82 are each pivotally connected to a butterfly mount base 84 at a butterfly pivotal joint 85, so as to be pivotable in a common vertical x-z plane, to and from respective working horizontal positions parallel to the x-axis and upwardly inclined stowed positions (not shown) at acute angles to the z-axis in the x-z plane. As illustrated, the seat and handlebar arms 80, 82 are connected to the pivotal joint 85 at side-by-side offset positions on the y-axis, such that they pivot in parallel x-z planes spaced apart by a generally negligible distance in the y-direction. In other embodiments not shown, seat and handlebar arms can instead be connected to a butterfly mount base by separate pivotal joints that are spaced apart by a sufficient distance direction to allow the two arms to pivot upward to stowed positions in the same vertical plane without impinging on each other.

When in their respective working horizontal positions as depicted in the drawing, the seat arm 80 is adapted and configured to support a seat underside of a bicycle B (truncated portions shown in the drawing for illustrative purposes) so as to support the underside of a bicycle seat (not shown) connected to the seat post SP, while the extendable handlebar arm 82 is adapted and configured at the same time to support the underside of a handlebar HB of the bicycle B. In turn, the butterfly mount base 84 is pivotally connected to the distal end 40 of the folding extension arm 14 by a third vertical bolt joint 449 for rotation of the butterfly mount base 84 in the folding (x-y) plane of the extension arm 14, allowing for rotation of a supported bicycle B to a desired horizontal angle to the wall mount 12 (and thus, for example, to a wall to which the wall mount 12 is mounted).

The extendable seat arm 80 comprises a proximal base segment 86 and a distal telescoping end segment 88, the base segment 86 having an elongate straight section 87 extending distally from the proximal end of the seat arm 80 to the end segment 88, and the end segment 88 having an elongate straight section 89 that is mated to the straight section 87 in a sliding (more particularly, telescoping) connection, to permit length adjustment of the seat arm 80 by sliding the straight section 89 of the end segment 88 into and out of the straight section 87 of the base section 86 along a shared axis of the straight segments (designated in FIG. 5 as the x-axis of the reference coordinate system). The end segment 88 comprises a seat yoke 90 connected to a distal end of the straight section 89, the seat yoke 90 having forked distal prongs 92, 94 that are horizontally offset to opposite sides of the straight section 89, so as to form an opening 96 for receiving a bicycle seat post SP between the yoke prongs 92, 94, the seat post SP extending generally upwardly to a bicycle seat (not shown) to be supported on the extendable seat arm 80 above the seat yoke 90 in the horizontal working position. The seat arm 80 further comprises a quick-release tube clamp 98 retained around the straight section 87 of the base segment 86 so as to be manually operable to lock and release said sliding/telescoping length adjustment movement of the end segment 88 relative to the base segment 86.

Similarly, the extendable handlebar arm 82 comprises a proximal base segment 99 with a straight elongate section 101 and a distal telescoping end segment 102 with a straight elongate section 103, the straight section 101 of the base segment 99 extending from the proximal end of the handlebar arm 82 to meet the straight section 103 of the end segment 102, the straight sections 101, 103 being mated in a sliding/telescoping connection substantially as described above, to provide for length adjustment of the handlebar arm 82 by sliding/telescoping the end segment 102 into and out of the base segment 99, the handlebar arm 82 further comprising a quick-release tube clamp 105 retained around the straight section 101 of the base segment 99 so as to be manually operable to lock and release said sliding/telescoping length adjustment movement of the end segment 102 relative to the base segment 99. The end segment 102 comprises a handlebar yoke 104 connected to a distal end of the straight section 103, the handlebar yoke 104 having forked end segments 106, 108 that are offset to opposite lateral sides of the straight section 103. In addition, the end segments 106, 108 extend downwardly and then upwardly to their distal ends to form respective laterally spaced apart upturned hooks 110, 112. Thus the handlebar HB of the bicycle B can be hung on the hooks 110, 112, with its stem S accommodated in the mediolateral gap between the hooks 110, 112.

According to a use example of the butterfly mount bicycle hanger 400 to hang the bicycle B, the hanger 400 is initially in a stowed configuration, with the folding extension arm 14 folded against the wall mount 12 and the extendable seat and handlebar arms 80, 82 in their near-vertical stowed positions. First, a user pulls the butterfly mount 416 to a desired position away from the wall mount 12 (for example by one or both the arms 80, 82) and lowers the arms 80, 82 to their horizontal working positions. Next, the user lifts the handlebar HB over and onto the hooks 110, 112 of the handlebar yoke 104 with a stem S disposed between the hooks 110, 112, and a frame of the bicycle B being oriented upright and generally in the x-z plane, the front of the bicycle B facing in the positive x direction of FIG. 5. With the bicycle B thus hanging by its handlebar HB, its rear wheel either hanging freely over or resting on a floor surface, depending on the mounting height of the wall mount 12, the user then releases the tube clamp 98 and slides the seat arm end segment 88 forward so as to allow the seat post SP clearance to swing behind the seat yoke 90, lifts the rear end of the bike B upward, pivoted by the handlebar HB supported on the hooks 110, 112, until the bicycle seat is above the top of the yoke 90. If necessary, the user also "steers" the bicycle seat around the yoke 90 while lifting the rear end, by pivoting the frame horizontally about a headset—not shown—that is connected to the handlebar HB, so as to maneuver the seat itself out of the x-z plane to avoid the yoke 90 and then back into the x-z plane once above the yoke 90.

While manually holding the rear end of the bicycle B in this position, the user then slides the seat arm end segment 88 backward so that the seat yoke 90 receives the seat post SP in the opening 96, between the prongs 92, 94, optionally "bottoming out" the seat post SP against the proximal end of the opening 96. The user then lowers the bicycle seat onto the seat yoke 90 and locks the tube clamp 98 to hold the end segment 88 in position with the seat yoke 90 under the bicycle seat. Alternatively, with the seat arm 80 adjusted to and locked at a suitable length and handlebar HB supported on the hooks 110, 112, the user can push the bicycle B rearwardly while lifting slightly so that the handlebar HB rides up the proximal sides of the hooks 110, 112, lifts the bicycle seat around the yoke 90 and above its height, then pivots the seat post SP behind the distal end of one of the prongs 92, 94 and into position between them and facing the opening 96, then allows the handlebars HB to settle back downwardly and forwardly into the bottoms of the hooks 110, 112 so that the seat post SP moves forwardly into the opening 96 and is retained between the prongs 92, 94 (though not necessarily moved all the way forward against the proximal end of the opening), and finally lowers the bicycle seat onto the yoke 90.

Figure 6:
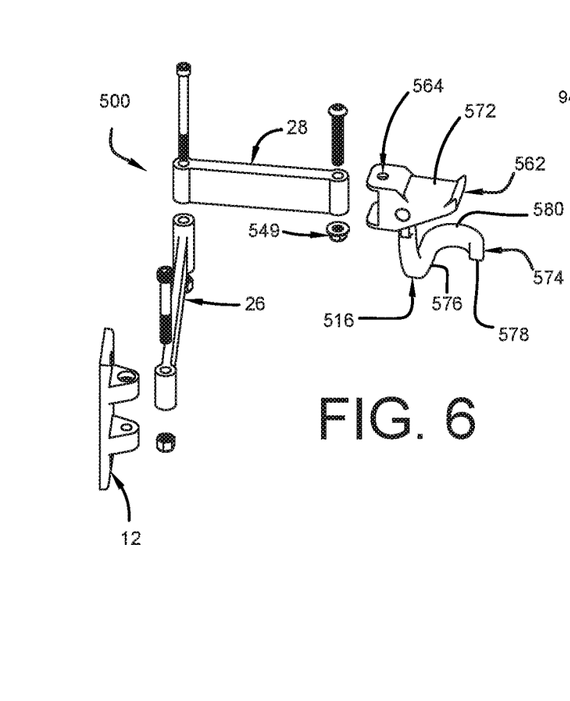
FIG. 6 is an exploded perspective view of a seat mount bicycle hanger according to another embodiment.

Still another embodiment of a bicycle hanger including the folding extension arm 14 is shown in FIGS. 6 and 7 as a seat mount bicycle hanger 500. Like the seat mount bicycle hanger 200, the hanger 500 includes a bicycle seat mount 516 that is rotatably connected directly to the second arm segment 28 by a third vertical bolt joint 549 so as to permit relative rotation only in the horizontal folding plane of the extension arm 14. The seat mount 516 comprises a wedge-shaped seat cradle 562 having a connecting portion 564 for connecting to the second arm segment 28 by a simple bolted joint and a formed support portion 572 adapted to receive the underside of a typical narrow front section of a standard bicycle saddle placed thereon. In addition to the foregoing elements and features that are analogous to similar numbered elements and features of the previously described seat cradle 62, the seat cradle 562 further includes a seat post hook 574 connected to its bottom side. The seat post hook 574 is shaped to wrap behind and around the sides of a bicycle seat post, including an inboard segment 576 shaped to span an entire diameter of the seat post on an inboard side, an outboard hook end 578 shaped to overlap at least a portion of the diameter of the seat post on an outboard side opposite the inboard side, and a rear segment 580 of the seat post hook 574 being connected between the inboard segment 576 and the outboard hook end 578 so as to wrap around an entire rear half of the seat post circumference, when a bicycle seat is supported on the formed support portion 572 with the corresponding bicycle seat post disposed behind the formed support portion 572. Thus, when a bicycle is so supported on the seat mount bicycle hanger 500, the formed support portion 572 obstructs the seat post of the supported bicycle from being displaced forwardly, the inboard and rear segments 576, 580 of the seat post hook 574 obstruct its displacement in respective inboard and rearward directions, and the outboard hook end 578 at least partially obstructs so as to resist its displacement in an outboard direction opposite the inboard direction. In this manner, the formed support portion 572 and the seat post hook 574 combine to obstruct or resist such seat post movement of a supported bicycle in any horizontal direction, so as to help prevent the seat from inadvertently slipping off of the formed support portion 572.

Figures 8, 9:
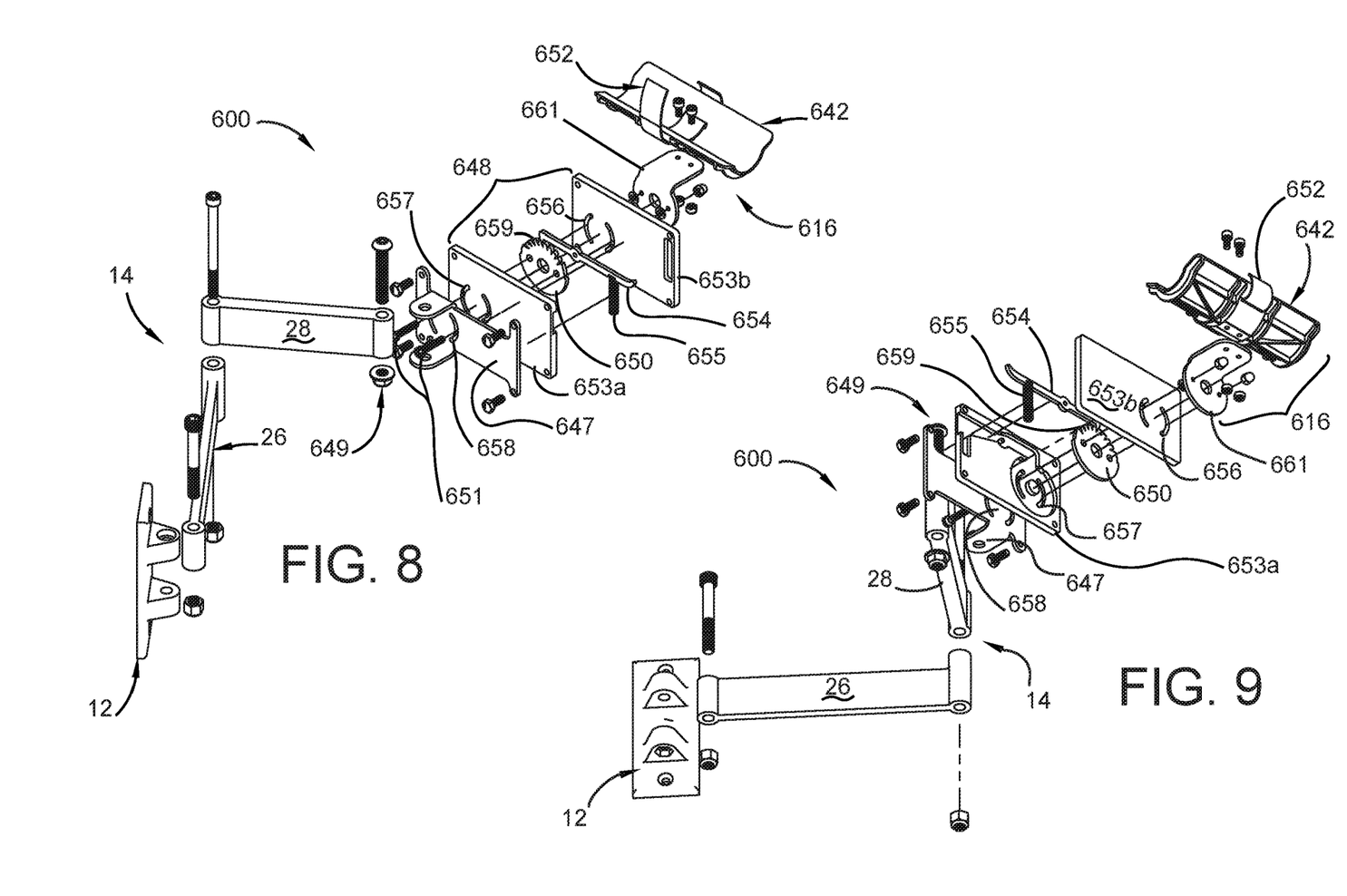
FIG. 8 is a top exploded perspective view of a top tube mount bicycle hanger according to another embodiment.
FIG. 9 is a bottom exploded perspective view of the top tube mount bicycle hanger of FIG. 8.

Yet another embodiment of a bicycle hanger including the folding extension arm 14 is shown in FIGS. 8 and 9 as a top tube mount bicycle hanger 600. Similarly to the top tube mount bicycle hanger 100, the hanger 600 includes a top tube mount 616 that is pivotally connected to the folding extension arm 14 for rotation relative thereto in a vertical tilting plane and in the horizontal folding plane of articulation of the extension arm 14. Like the top tube mount 16 previously described, the top tube mount 616 comprises a top tube cradle 642 fixedly connected to a top tube base 661, as well as a top tube strap 652 secured to the top tube cradle 642, which may for example be a hook-and-loop fastener strap that is operative to b e wrapped over a top side of a bicycle top tube supported on the top tube cradle 642 and fastened so as to hold the bicycle top tube down against the top tube cradle 642. A connecting plate 647 is connected to the second arm segment 28 for rotation in the folding plane of articulation of the folding extension arm 14 by a vertical bolt joint 649, the top tube base 661 in turn being connected to the connecting plate 647 for rotation in the vertical tilting plane, by a rapidly adjustable locking joint assembly 648. The locking joint assembly 648 includes a locking disk 650 fixedly connected to the top tube base 661 by a pair of eccentric bolts 651, the locking disk 650 being rotatably retained between a rear casing 653*a* and a front casing 653*b*, together with a locking lever 654 that is pivotally retained between the casings 653*a*, 653*b* and biased by a compression spring 655 into locking engagement with the locking disk 650 so as to prevent rotation of the locking disk 650 relative to the casings 653*a*, 653*b*. In turn, the casings 653*a*, 653*b* are fixedly connected (bolted) to the connecting plate 647, and the eccentric bolts 651 are retained in aligned arcuate slots 656, 657, and 658 formed respectively in the front and rear casings 653*b*, 653*a* and in the connecting plate 647, the arcuate slots 656-658 extending circumferentially about the axis of rotation of the locking disk 650 over an angular range that defines the range of tilting adjustments permitted by the locking joint assembly 648. The locking disk 650 comprises a row of locking teeth 659 spaced along an arc of its circumference subtending the same tilting adjustment range angle as the arcuate slots 656-658, the locking lever 654 being operative to lock into gaps between the locking teeth 659 spaced apart at equal incremental angular intervals within the range angle. To adjust the tilt angle of the top tube mount 616 in the vertical tilting plane, a user manually depresses the locking lever 654 to unlock rotation of the locking disk 650, tilts the top tube of a bicycle supported on the top tube cradle 642 by an angle corresponding to (for example, approximately equal to) a multiple of the incremental angular interval, and releases the locking lever 654, the spring 655 biasing the locking lever 654 to engage the tooth gap of the locking disk 650 corresponding to an angular displacement equal to the nearest multiple of the incremental angular interval. For example, the joint assembly 648 can allow adjustment of the top tube tilt angle by +/−60° from horizontal, in 10° angular increments.

Figures 10, 11:
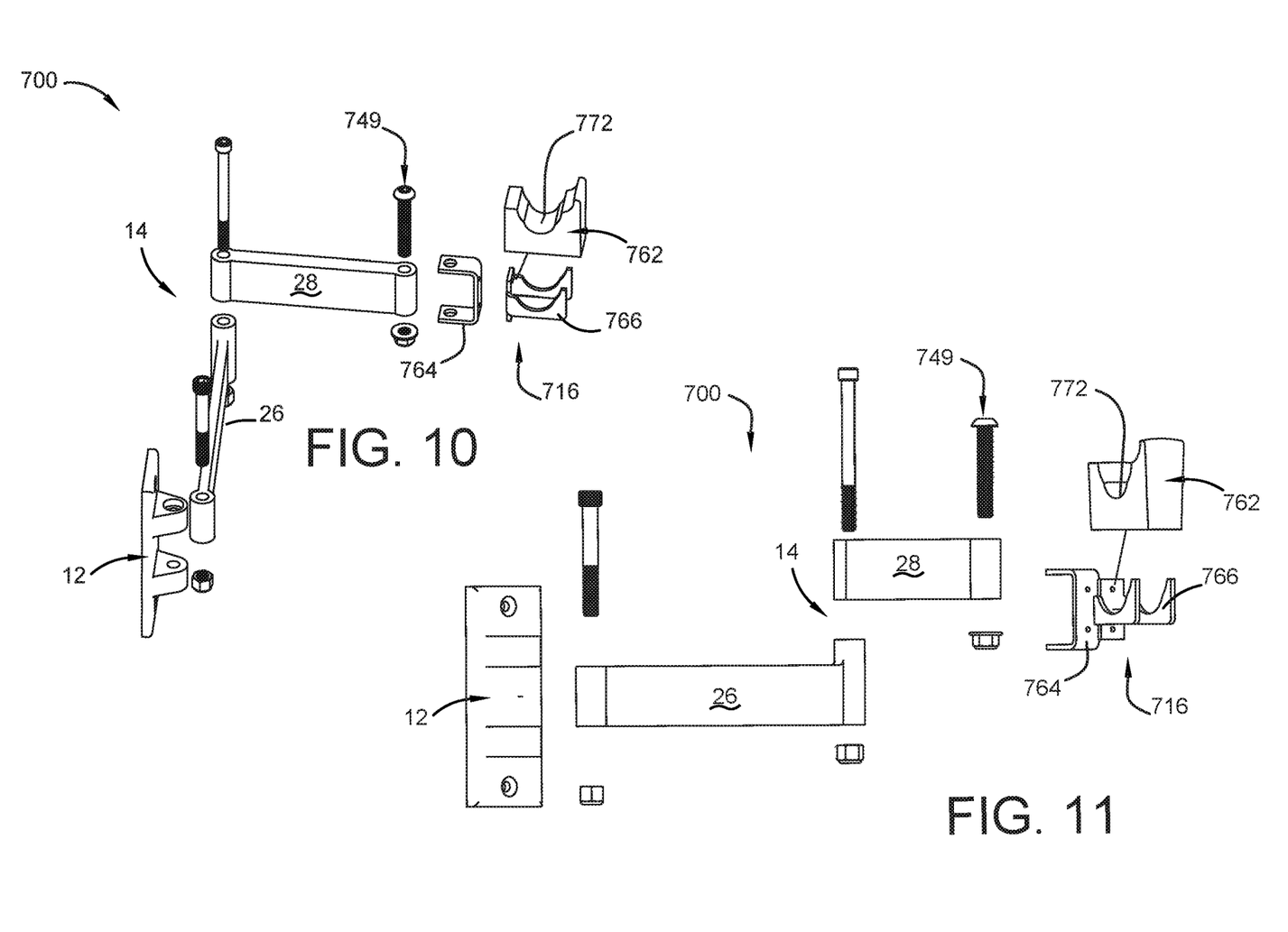
FIG. 10 is an exploded perspective view of a wheel mount bicycle hanger according to another embodiment.
FIG. 11 is an exploded elevation view of the wheel mount bicycle hanger of FIG. 10.

Still another embodiment of a bicycle hanger including the folding extension arm 14 is shown in FIGS. 10 and 11 as a wheel mount bicycle hanger 700. The linkage of the wheel mount bicycle hanger 700 is essentially the same as that of the seat mount bicycle hangers 200 and 500, comprising a wheel mount 716 pivotally connected to a distal end of the folding extension arm 14 so as to pivot horizontally in its folding plane of articulation. The wheel mount 716 comprises a wheel cradle 762, a wheel cradle base 763 supporting the wheel cradle 762, such as the wheel cradle 762 being formed of a compressible material, having a tapered plug profile, and being press fit into the wheel cradle base 763, the wheel cradle base 763 being fixedly connected to a connecting bracket 764, the connecting bracket 764 in turn being pivotally connected to the second arm segment 28 of the arm 14. The wheel cradle 762 has a formed support portion 772 shaped to receive a portion of an inner periphery of a bicycle wheel rim extending between a pair of spokes, so that a bicycle can be hung by the wheel rim portion placed on the formed support portion 772.

These and other advantages of the invention will be further understood and appreciated by those skilled in the art by reference to the following written specification, claims and appended drawings. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A bicycle hanger comprising a wall mount a folding extension arm connected to the wall mount a bicycle support connected to the folding extension arm; and [a connecting link connected between the second arm segment and the bicycle support;] the wall mount having a rear side, a front side, a top side, and a bottom side, the wall mount being adapted to be fixedly mounted to a vertical wall with the wall mount rear side facing the vertical wall; the folding extension arm comprising a first arm segment and a second arm segment, the first arm segment having a first arm segment proximal end and a first arm segment distal end, the second arm segment having a second arm segment proximal end and a second arm segment distal end, the folding extension arm having a proximal end at the first arm segment proximal end and a distal end at the second arm segment distal end, the first arm segment proximal end being pivotally connected to the wall mount, the second arm segment proximal end being pivotally connected to the first arm segment distal end, so that the folding extension arm is articulable in a folding plane, the folding plane being horizontal when the wall mount is mounted in an upright orientation to the vertical wall, with the wall mount top side positioned vertically above the wall mount bottom side; the bicycle support being connected to the distal end of the folding extension arm, the bicycle support being adapted to support a bicycle by hanging the bicycle on the bicycle support; the bicycle support being rotatably connected to the distal end of the folding extension arm to permit rotation of the bicycle support relative to the distal end of the folding extension arm in a tilting plane, the tilting plane being vertical when the wall mount is mounted in the upright orientation; a connecting link connected between the second arm segment and the bicycle support; the connecting link being connected to the second arm segment by a first connecting link pivotal joint and to the bicycle support by a second connecting link pivotal joint.

2. The bicycle hanger of claim 1 further comprising the first connecting link pivotal joint permitting the connecting link to rotate in the folding plane relative to the second arm segment and the second connecting link pivotal joint permitting the bicycle support to rotate in the tilting plane relative to the connecting link.

3. The bicycle hanger of claim 2 wherein the second connecting link pivotal joint comprises a locking mechanism that is engageable to hold a bicycle on the bicycle support at a selected pitch angle in the tilting plane and disengageable to permit adjustment of the pitch angle of a bicycle frame supported on the bicycle support.

4. The bicycle hanger of claim 3 wherein the second connecting link pivotal joint comprises a locking bolt.

5. The bicycle hanger of claim 4 wherein the second connecting link pivotal joint comprises a first locking ring affixed to the connecting link, a second locking ring affixed to the bicycle support and axially opposed to the first locking ring, an axial biasing element providing an axial biasing force tending to bias the second locking ring axially against the first locking ring, and a manual adjuster operative to increase and decrease the axial biasing force to lock and unlock rotation of the second connecting link pivotal joint.

\* \* \* \* \*